US008409515B2

(12) United States Patent
Ren et al.

(10) Patent No.: US 8,409,515 B2
(45) Date of Patent: Apr. 2, 2013

(54) EXHAUST GAS TREATMENT SYSTEM

(75) Inventors: Shouxian Ren, Ypsilanti, MI (US);
Michael Christopher Luckham, Highland, MI (US); David B. Brown, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 727 days.

(21) Appl. No.: 12/502,464

(22) Filed: Jul. 14, 2009

(65) Prior Publication Data
US 2011/0011068 A1    Jan. 20, 2011

(51) Int. Cl.
*F01N 3/10* (2006.01)
*B01D 50/00* (2006.01)

(52) U.S. Cl. ............ 422/171; 422/177; 60/282; 60/299; 60/301

(58) Field of Classification Search .................. 422/171, 422/177; 60/282, 299, 301
See application file for complete search history.

(56) References Cited

U.S. PATENT DOCUMENTS

| 6,311,484 | B1 * | 11/2001 | Roth et al. ...................... 60/301 |
| 6,895,747 | B2 * | 5/2005 | Upadhyay et al. ............... 60/286 |
| 7,000,383 | B2 * | 2/2006 | van Nieuwstadt et al. ...... 60/286 |
| 7,063,642 | B1 * | 6/2006 | Hu et al. ....................... 477/100 |
| 7,207,169 | B2 * | 4/2007 | Nakanishi et al. ............... 60/275 |
| 7,396,517 | B2 | 7/2008 | Lee |
| 7,997,071 | B2 * | 8/2011 | Blaisdell ......................... 60/324 |
| 8,006,481 | B2 * | 8/2011 | Schmieg et al. ................. 60/286 |
| 8,110,151 | B2 * | 2/2012 | Blaisdell et al. .............. 422/176 |
| 2005/0002843 | A1 * | 1/2005 | Kim et al. ................... 423/239.1 |
| 2005/0069476 | A1 | 3/2005 | Blakeman et al. |
| 2005/0091968 | A1 | 5/2005 | van Nieuwstadt et al. |
| 2008/0066454 | A1 | 3/2008 | Viola |
| 2008/0066456 | A1 | 3/2008 | Schmieg et al. |
| 2008/0070778 | A1 | 3/2008 | Castellano et al. |
| 2008/0131345 | A1 | 6/2008 | Vitse et al. |
| 2009/0031702 | A1 | 2/2009 | Robel |

OTHER PUBLICATIONS

Steven J. Schmieg, Richard J. Blint, Ling Deng; "Control Strategy for the Removal of NOx from Diesel Engine Exhaust using Hydrocarbon Selective Catalytic Reduction", SAE International, 08FFL-0211, 2008.
Michael B. Viola, "HC-SCR Catalyst Performance in Reducing NOx Emissions from a Diesel Engine Running Transient Test Cycles", SAE International, 2008-01-2487, 2008.

* cited by examiner

*Primary Examiner* — Nina Bhat
(74) *Attorney, Agent, or Firm* — Cantor Colburn LLP

(57) ABSTRACT

An emission treatment system for a vehicle having an internal combustion engine is described. The emission treatment system has an HC-SCR catalyst including a non-Pt group metal dispersed in a ceramic matrix configured to receive an exhaust gas flow from an engine. The system also has an oxidation catalyst comprising a Pt group metal configured to receive the exhaust gas flow from the HC-SCR catalyst. The system also has a U-SCR catalyst and a diesel particulate filter, one of the U-SCR catalyst or the DPF configured to receive the exhaust gas flow from the oxidation catalyst and the other one of the U-SCR catalyst or the diesel particulate filter configured to receive the exhaust gas flow from the respective one.

20 Claims, 3 Drawing Sheets

EXHAUST GAS TREATMENT SYSTEM

FIELD OF THE INVENTION

Exemplary embodiments of the present invention are related to exhaust gas treatment systems, and, more specifically, to an exhaust gas treatment system for a lean burn internal combustion engine.

BACKGROUND

Manufacturers of internal combustion engines develop engine control strategies to satisfy customer demands and meet various regulations for emissions and fuel economy. One such engine control strategy comprises operating an engine at an air/fuel ratio that is lean of stoichiometry to improve fuel economy and reduce greenhouse gas emissions. Such operation is possible using compression-ignition (diesel) and lean-burn spark-ignition engines. When an engine operates with lean (excess oxygen) air/fuel ratio, the resultant combustion temperature is lower, leading to decreased engine-out $NO_X$ emissions; however, commercial application of lean-operating engines is limited due to lack of effective methods to remove $NO_X$ under a lean exhaust condition. Thus, efficient reduction of nitrogen oxides ($NO_X$=$NO+NO_2$) from diesel and lean-burn gasoline exhaust is important to meet future emission standards and improve vehicle fuel economy.

Reduction of $NO_X$ emissions from an exhaust feedstream containing excess oxygen is a challenge for vehicle manufacturers. By way of example, it is estimated that compliance with Bin 5 regulations in the United States may require an aftertreatment system capable of 70-90% $NO_X$ conversion efficiency on the FTP (Federal Test Procedure) cycle based on currently anticipated engine-out $NO_X$ levels. For practical application, the conversion efficiency must be obtained at a low temperature operating range (e.g., 200-350° C.) occurring during the aforementioned FTP cycle and at a higher temperature operating range (e.g., 450-550° C.) occurring during a high speed test cycle (e.g., US06 Federal Test Procedure).

Several potential aftertreatment systems have been proposed for vehicle applications. One approach comprises using an aftertreatment system including injecting a $NO_X$ reductant, e.g., urea, upstream of a urea selective catalyst reduction (U-SCR) catalyst, to reduce $NO_X$ to $N_2$. Use of urea as a reductant necessitates a urea distribution infrastructure and an on-vehicle monitoring system for this secondary fluid, and may have potential problems in cold weather climates due to the relatively high freezing point (−12° C.) of the urea solution. $NO_X$ storage catalysts typically require large catalyst volumes, large amounts of platinum-group metals and low sulfur fuel for efficient storage operation. Such systems require periodic catalyst regeneration involving fuel injection to generate high exhaust gas temperatures and injection of reductants to regenerate the storage material of the catalyst.

Selective catalytic reduction of $NO_X$ using hydrocarbons (HC-SCR) has been studied extensively as a potential alternative method for the removal of $NO_X$ under oxygen-rich conditions. Ion-exchanged base metal zeolite catalysts (e.g., Cu-ZSM5) have typically not been sufficiently active under typical vehicle operating conditions (e.g., <350° C.), and are susceptible to degradation by sulfur dioxide and water exposure. Catalysts employing platinum-group metals (e.g., $Pt/Al_2O_3$) operate effectively over a narrow temperature window and are highly selective towards $N_2O$ production.

Catalytic devices using alumina-supported silver (Ag/$Al_2O_3$) have received attention because of their ability to selectively reduce $NO_X$ under lean exhaust conditions with a wide variety of hydrocarbon species. The use of partially oxidized hydrocarbons (e.g., alcohols) over Ag/$Al_2O_3$ allows reduction of $NO_X$ at lower temperatures. However such reductants are unavailable on-board the vehicle. Previous HC-SCR over Ag/$Al_2O_3$ catalysts utilized light hydrocarbons (e.g., propene, propane) and heavier fuel-component hydrocarbons (e.g., octane, decane) as a reductant. $NO_X$ reduction using lighter hydrocarbons present in engine exhaust as the combustion products yield conversion at higher temperature, but for Ag/$Al_2O_3$ catalysts to be considered as candidates for practical use, the NO reduction must be shifted to a lower temperature region and the fuel on-board the vehicle must be used as the reductant.

Therefore, there is a need for an effective method and apparatus to selectively reduce $NO_X$ in an exhaust gas feedstream for vehicles and other applications of lean-burn internal combustion engines.

In U.S. Patent Nos. 8,006,481, 7,591,132 and 7,943,548, assigned to the same assignee as this application, and hereby incorporated herein by reference in their entirety, a method and apparatus are provided to selectively reduce $NO_X$ emissions of an internal combustion engine, including an exhaust aftertreatment system comprising a silver-alumina, or a silver-platinum group metal-alumina, catalytic reactor device and a device operative to dispense a hydrocarbon reductant into the exhaust gas feedstream upstream of the silver-alumina catalytic reactor device. A control system is adapted to determine a parametric measure of $NO_X$ gases in the exhaust gas feedstream; and, dispensing hydrocarbon reductant into the exhaust gas feedstream upstream of the silver-alumina catalytic reactor device based upon the parametric measure of $NO_X$ gases. This includes determining a preferred hydrocarbon/$NO_X$ ratio; and, dispensing the hydrocarbon reductant into the exhaust gas feedstream upstream of the silver-alumina catalytic reactor device based upon the preferred hydrocarbon/$NO_X$ ratio, preferably during lean operation of the internal combustion engine. While the exhaust systems described in these applications are useful in reducing $NO_X$ emissions, the configurations may not be optimized with regard to other exhaust system considerations, including efficient urea conversion and usage and possible urea slip during operation, as well as HC emission spikes and exhaust odor during cold starts.

While the foregoing exhaust treatment systems and methods each contribute to the control of emissions associated with various internal combustion engine configurations and operating schemes, including lean burn operating conditions, systems and methods that provide improved reduction, control, or a combination thereof, of emissions are desirable.

SUMMARY OF THE INVENTION

In one exemplary embodiment of the present invention, an emission treatment system for a vehicle having an internal combustion engine is disclosed. The emission treatment system includes an HC-SCR catalyst including a non-Pt group metal catalyst material disposed on a ceramic matrix and configured to receive an exhaust gas flow from an engine. The system also includes an oxidation catalyst comprising a Pt group metal catalyst material configured to receive the exhaust gas flow from the HC-SCR catalyst. The system also includes a U-SCR catalyst and a diesel particulate filter, one of the U-SCR catalyst or the DPF configured to receive the exhaust gas flow from the oxidation catalyst and the other one of the U-SCR catalyst or the diesel particulate filter (DPF) configured to receive the exhaust gas flow from the respective one.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
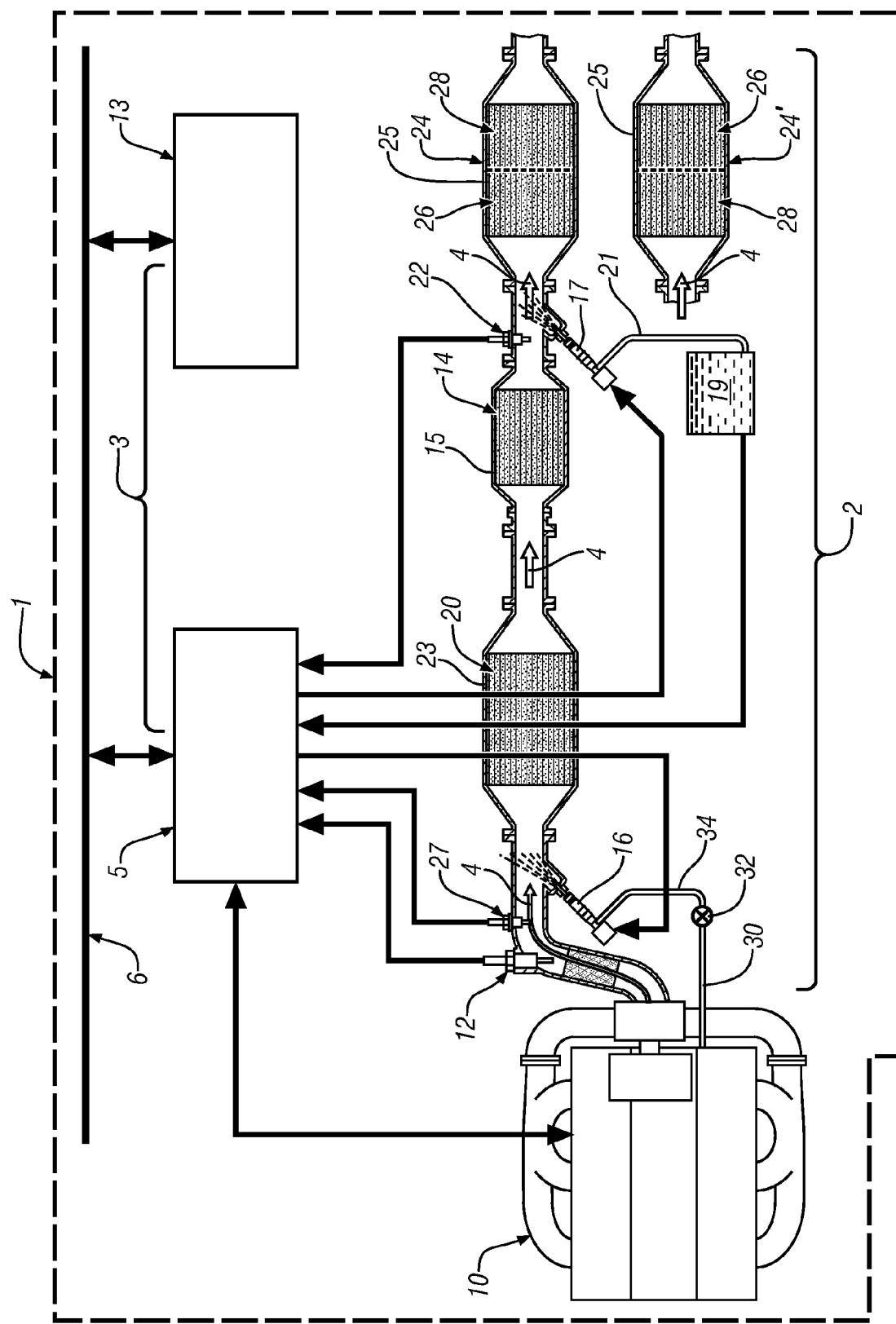
FIG. 1 is a schematic illustration of an exemplary embodiment of an exhaust gas treatment system as disclosed herein.
Figure 2:
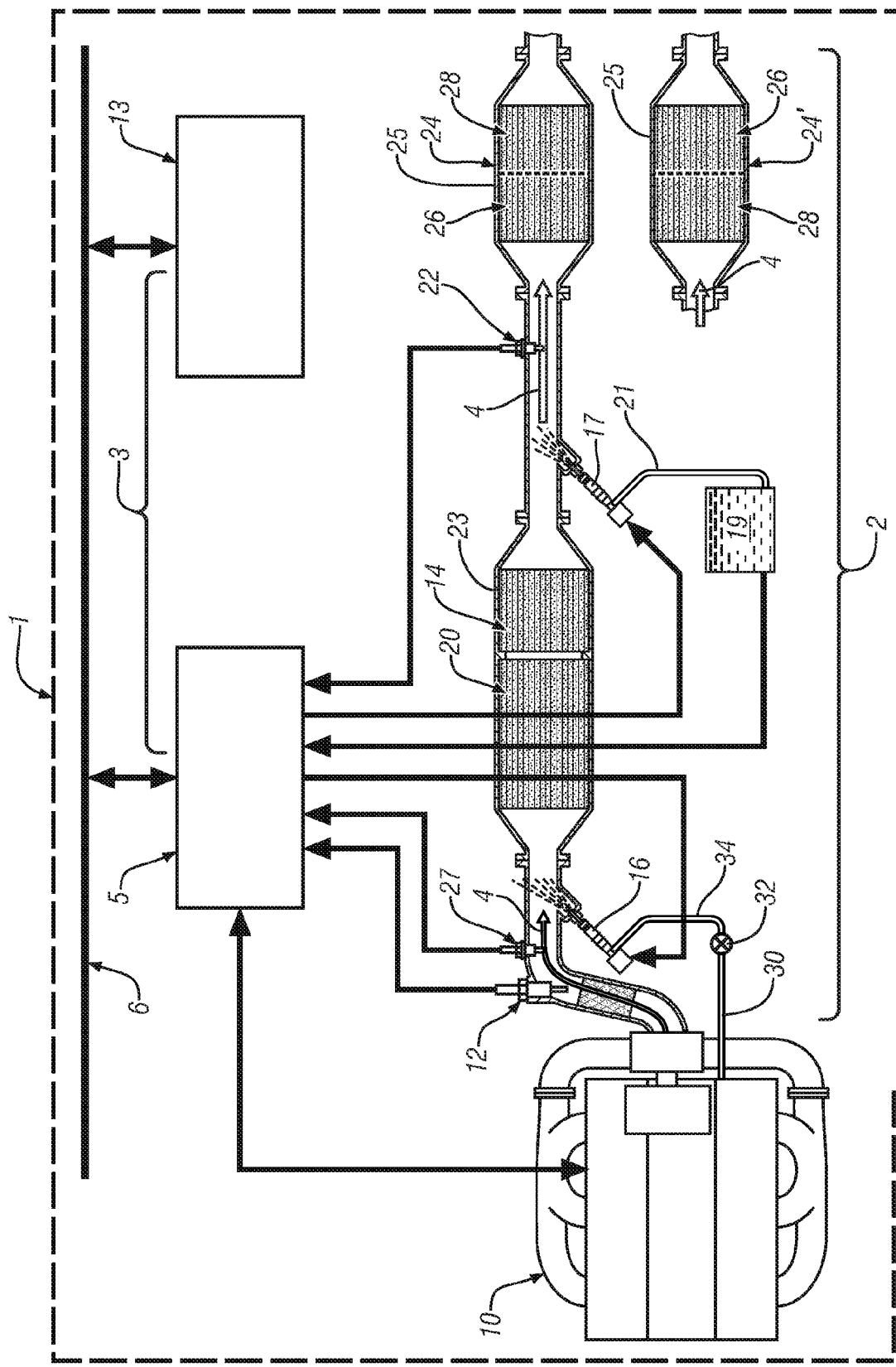
FIG. 2 is a schematic illustration of a second exemplary embodiment of an exhaust gas treatment system as disclosed herein.
Figure 3:
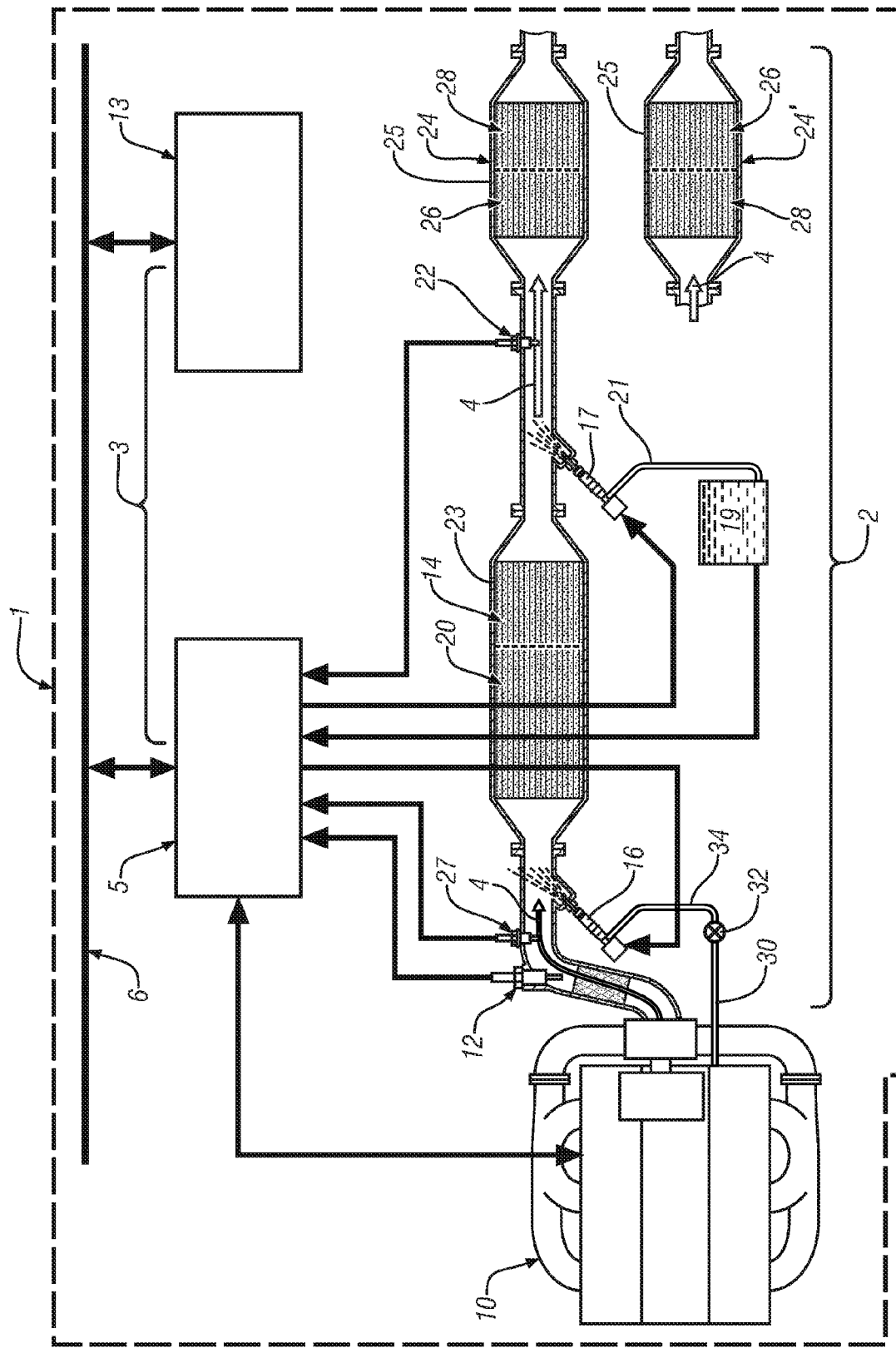
FIG. 3 is a schematic illustration of a third exemplary embodiment of an exhaust gas treatment system as disclosed herein.

Referring to FIGS. 1-3, schematic diagrams depict exemplary embodiments of an internal combustion engine 10 that is particularly suitable for use in many types of motorized vehicles 1, such as automobiles, light trucks, marine vehicles, ATVs and the like. Engine 10 includes an exhaust emission after-treatment system 2, including an exhaust treatment control system 3 that has been constructed in accordance with the present invention. These exemplary embodiments of exhaust emission system 2 include a hydrocarbon selective catalytic reduction (HC-SCR) catalyst 20 that is positioned upstream of an oxidation catalyst (OC) 14 such as a diesel oxidation catalyst, that is in turn located upstream of two-way catalyst 24 that includes a urea selective catalyst reduction (U-SCR) catalyst 26 and a particulate filter (PF) 28, such as a DPF. These arrangements of exhaust emission treatment system 2 advantageously associate HC-SCR 20 and OC 14 with one another, with OC 14 located downstream of HC-SCR 20 as described, but locates both of these components upstream of two-way catalyst 24. This configuration of exhaust emission treatment system 2 provides the following advantages. First, the HC-SCR 20 will provide $NO_X$ reduction during periods (e.g., operating temperatures >400° C.) when the U-SCR $NO_X$ reduction efficiency is reduced, including periods during which DPF 28 is being regenerated. The fact that HC-SCR 20 is located away from two-way catalyst 24 also provides physical separation of these devices, thereby preventing the high temperatures associated with DPF 28 regeneration from reducing the $NO_X$ reduction capacity of HC-SCR 20. Secondly, the addition of HC-SCR 20 provides additional $NO_X$ reduction capacity to system 2, such that high urea dosing rates are not needed in order to obtain the required $NO_X$ conversion capacity, even when system 2 requires high $NO_X$ conversion efficiency. Thus, high $NH_3$ slip rates (i.e., $NH_3$ that slips past the U-SCR catalyst 26) associated with high urea dosing rates may be avoided. Thirdly, in view of the benefits described above, high urea consumption associated with high urea dosing rates, particularly during DPF regeneration, may be avoided, thereby lowering the usage and associated cost of urea for operating the system, and increasing the time intervals between refill of the urea tank. Fourthly, tail pipe HC emissions spikes and associated exhaust odor during engine cold starts may be reduced with HC retention by an HC-SCR upstream of OC 14. Fifthly, the heat generated by OC 14, together with the physical separation of OC 14 and two-way catalyst 24 facilitates the conversion of urea to $NH_3$, thereby reducing the possibility of $NH_3$ slip, increasing the conversion efficiency of the urea/$NH_3$ conversion and increasing the $NO_X$ conversion efficiency and capacity of U-SCR 26. The physical spacing of OC 14 and two-way catalyst 24 provides greater distance over which the urea may interact and react with water to produce ammonia, thereby improving the conversion efficiency of the urea and providing sufficient opportunity for this reaction to proceed, thus reducing the possibility of urea slip past the U-SCR 26. The heat added by OC 14 further facilitates the urea conversion. Sixthly, realization of this synergy as described above enables reduction of the size of the urea tank with an associated reduction in the weight of the tank and urea associated therewith, thereby lowering the weight of vehicle 1, all things being equal. Seventhly, the location of OC 14 just upstream of the two-way catalyst 24 increases the efficiency of usage of post-injected fuel (or fuel used in conjunction with the process by creation of a rich operating condition in engine 10), since post-injected fuel is used only for generating heat, and this arrangement places OC 14 in close proximity to two-way catalyst 24, thereby reducing heat losses from the fuel usage and increasing the efficiency of engine 10 or vehicle 1, or both of them. Eighthly, this synergistic arrangement increases the $NO_X$ conversion capacity and efficiency of exhaust emission system 2 and promotes compliance with various exhaust emissions regulations, including diesel exhaust emissions regulations. Ninthly, enhancement of the $NO_X$ conversion capacity and efficiency lowers the cost of exhaust emission treatment system 2 by enabling the sizes of the various components of this system to be reduced, thereby reducing the amount of material of used in these components particularly catalyst materials. Tenthly, by location of HC-SCR 20 and OC 14 in the same housing (FIGS. 2 and 3) and further by incorporating them into a single monolith in one can (FIG. 3), particularly advantageous combinations of these components to achieve the operational synergies and cost advantages described may be achieved.

The exemplary engine and control system comprises a conventional four-cycle internal combustion engine 10 and electronic engine control module (ECM) 5. The engine may include a known compression-ignition or diesel engine having an operating regime such that it is primarily a lean-burn engine, such that it is operated on a fuel/air mixture where the amount of fuel is lower or leaner than the stoichiometric amount required for combustion. Alternately, engine 10 may include an engine employing any one of a number of engine control strategies that operate lean of stoichiometry, e.g., homogeneous-charge compression-ignition engines, and lean-burn spark-ignition engines. Engine 10 includes a plurality of reciprocating pistons attached to a crankshaft, which is operably attached to a vehicle driveline or powertrain to deliver tractive torque to the driveline. During operation, internal combustion processes in engine 10 generate an exhaust gas feedstream or flow that travels in the direction illustrated by arrow 4 and contains regulated constituents as combustion by-products, and that must be transformed by the after-treatment system prior to release from the system. The constituents of exhaust gas flow 4 produced by engine 10 under lean combustion conditions include hydrocarbons (HC), carbon monoxide (CO), oxides of nitrogen ($NO_X$), and particulate matter (PM), among others.

Exhaust after-treatment system 2 is an integrated system intended to treat the regulated constituents of the exhaust gas flow 4 to produce an exhaust gas flow that includes unregulated constituents, or regulated constituents in amounts that may be released from the system to the external environment, such as by reducing amounts of the regulated constituents to acceptable levels or by chemically converting them to unregulated materials that may be released. An exhaust manifold, or manifolds, and associated conduits entrain and direct the exhaust gas flow 4 to and through the exhaust emission after-treatment system 2. Referring to FIG. 1, an exemplary embodiment of an after-treatment system 2 includes a combination of HC-SCR catalyst 20, OC 14 and two-way catalyst 24. Two-way catalyst 24 includes U-SCR 26 located upstream of PF 28, such as a DPF. Alternately, referring also to FIG. 1, a second exemplary embodiment of an after-treatment system 2 includes a combination of HC-SCR catalyst 20, OC 14 and two-way catalyst 24'. Two-way catalyst 24' includes PF 28 located upstream of U-SCR 26. Referring to FIGS. 1-3, the exhaust emission after-treatment systems 2 described herein, including the components or devices thereof described herein, employ technologies having various capabilities for treating the constituent elements of the exhaust gas feedstream, including oxidation, selective catalytic reduction, HC dosing and particulate filtering, as further described herein. The devices are fluidly and operably connected in series and in fluid communication with one another using known pipes or conduits and connectors to contain and channel the exhaust gas flow 4 through exhaust after-treatment system 2.

Referring to FIGS. 1-3, the HC-SCR catalyst 20 may include any suitable catalyst material that provides a hydrocarbon selective catalyst reduction of $NO_X$, and may provide the catalyst material in any suitable form that promotes the reduction reaction, including as a bed of self-supporting catalyst particles or beads, or supported catalyst particles or beads, and more particularly including forms where the catalyst material is provided as a washcoat on the walls of a metal or ceramic flow-through honeycomb-like monolith. In an exemplary embodiment, the catalyst material of HC-SCR 20 includes a non-Pt group metal-zeolite catalyst. The non-Pt group metal-zeolite catalyst includes a non-Pt group metal, or base metal, catalyst material disposed on a ceramic matrix. Any suitable non-Pt group metal that is capable of catalyzing the reduction of $NO_X$ may be used. Suitable non-Pt group metals include Ag, an Ag compound, or an Ag alloy, or a combination thereof disposed on a ceramic matrix that includes alumina. Suitable non-Pt group metals include copper (Cu), a Cu compound, a Cu alloy, chromium (Cr), a Cr compound or a Cr alloy, iron (Fe), an Fe compound or an Fe alloy, or a combination thereof disposed on a ceramic matrix that includes a zeolite. The non-Pt group metal catalyst materials may also include various transition metal or rare earth metals, or oxides of them, or alloys of them, or combinations thereof, as additives. Suitable transition metal or rare earth metal additives include Zr, Nb, Y, Hf, La, Ce or Nd, or an oxide of them, or an alloy of them, or a combination thereof The non-Pt group metal catalyst materials may also include Pt group metals or alloys of them, or combinations thereof, as additives. Suitable Pt group metal alloying additions include Pt, Rh, Ir, Ru, Re, Os or Pd, or alloys of them, or combinations thereof The catalyst material, including the non Pt group metal and any transition metal or rare earth metal alloying additions, may be present in an amount of at least about 1 $gm/cm^3$, and more particularly about 1 to about 4 $gm/cm^3$, and even more particularly about 2 to about 3 $gm/cm^3$.

The ceramic matrix may include any suitable ceramic matrix material. Suitable ceramic materials where the non-Pt group metals include Ag, Ag compounds, or Ag alloys, or combinations thereof, include those comprising alumina. Typically, the Ag-alumina catalyst comprises a range of about 1 to about 4 weight percent of Ag. In an exemplary embodiment, the catalyst material includes about 1 to about 4 wt % $Ag_2O$, and more particularly about 2 wt. % $Ag_2O$, supported on alumina, with the catalytic material provided as a washcoat that is supported on a 400 cell per square inch cordierite monolith substrate. In another exemplary embodiment, the catalyst material includes about 2 to 4 weight % silver in the form of $Ag_2O$, as well as a Pt group metal additive, supported on alumina as a ceramic matrix, and may be prepared by depositing ionic silver on highly hydroxylated alumina. The ratio of the atom fraction of the Pt group metal to the total of the atom fractions of the Pt group metal and Ag or Ag compound is less than or equal to about 0.25. In certain embodiments, the atomic fraction is less than or equal to about 0.20. In a specific embodiment, the atomic fraction of a combination of a platinum group metal and silver catalyst material is less than or equal to about 0.10. According to one or more embodiments, the catalyst contains less than about 1% platinum by weight, for example, less than or equal to about 0.75% platinum by weight, and more particularly, less than about 0.50% by weight. Suitable ceramic matrix materials where the non-Pt group metal catalyst include Cu, a Cu compound, a Cu alloy, chromium, a chromium compound, a chromium alloy, iron, an iron compound or an iron alloy, or a combination thereof, include those comprising a zeolite, such as ZSM-5, ZSM-11 or ZSM-12, or a combination thereof The ceramic matrix material may have any suitable zeolite structure and surface area sufficient to promote the catalytic reduction of $NO_X$ in conjunction with the catalyst materials supported thereon as described herein, including those zeolite structures having a surface area of at least about 400 $m^2/g$.

The non-Pt group metal-ceramic matrix catalyst may be disposed as a washcoat on a suitable substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 600 or more gas inlet openings (i.e., cells) per square inch of cross section. A ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like. The substrates useful for the catalysts of the present invention may also be metallic in nature and include one or more metals or metal alloys. The metallic substrates may be employed in various shapes such as corrugated sheet, or monolithic form as described above. Preferred metallic supports include heat resistant metals and metal alloys such as Ti, Ti alloys and various grades of stainless steel, as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface of the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the ceramic matrix and catalyst material to the substrate.

The non-Pt group metal-zeolite materials according to embodiments of the present invention may be prepared using well-known processes, including known methods for depositing single layer and multi-layer washcoats. A washcoat can be readily prepared in one or more layers on a monolithic honeycomb substrate. An exemplary process for preparing a bi-layer washcoat on a monolithic metal substrate is set forth below. It will be understood that the process below can be varied according to different embodiments of the invention to prepare single layer washcoats, by omitting the step of applying the second layer, or to add one or more additional layers to the bi-layer washcoat described below.

For a bi-layer washcoat, a bottom layer that includes finely divided particles of a high surface area refractory metal oxide, such as gamma alumina, are slurried in an appropriate vehicle, e.g., water. The substrate may then be dipped one or more times in such slurry or the slurry may be coated on the substrate (e.g., honeycomb flow through substrate) such that there will be deposited on the substrate the desired loading of the metal oxide. Catalyst materials, including non-Pt group metals and any rare earth, transition metal, or Pt group additives may be incorporated in the slurry as a mixture of water soluble or water-dispersible compounds or complexes. Thereafter, the coated substrate is typically calcined by heating, e.g., at 400 to 600° C. for 1 to 3 hours.

In one or more embodiments, the slurry is thereafter comminuted to result in substantially all of the solids having particle sizes of less than 20 microns, i.e., 1-15 microns, in an average diameter. The comminution may be conducted in a ball mill or other similar equipment, and the solids content of the slurry may be, e.g., 20-60 wt. %, preferably 35-45 wt. %.

Each layer thereafter prepared and deposited on the previously formed layer of the calcined composite may be prepared in a manner similar to that described above. After all coating operations have been completed, the composite is then again calcined by heating, e.g., at about 400 to about 600° C. for 1-3 hours.

The non-Pt group metal-zeolite catalyst, as well as any substrate on which it is disposed, including various monolithic substrates as described herein, is housed within a housing 23, including a metal housing, such as a metal can having an inlet opening and outlet opening, or otherwise, configured for providing support and directing fluid flow to the HC-SCR catalyst 20. The metal housing 23 may be made from suitable material, including various grades of high temperature, oxidation resistant steel, such as various stainless steels. The housing 23 may comprise any suitable shape or size including a cylindrically shaped compartment. The compartment further may include attachment features, such as a cylindrical inlet pipe located proximate an inlet opening and a cylindrical outlet pipe located proximate an outlet opening of the compartment for fluid coupling of HC-SCR catalyst 20 to an exhaust pipe and/or another component of the exhaust gas treatment system 2, particularly OC 14. It should be appreciated that HC-SCR catalyst 20, including the housing 23, may include one or more additional components for facilitating the operation of HC-SCR catalyst 20, or exhaust gas treatment system 2, or control system 3, including, but not limited to, various gas or temperature sensors, injectors (urea or fuel injectors) or otherwise. Such additional features may be particularly advantageous for monitoring characteristics of the exhaust gas, such as flow rate of certain emission components (e.g., particulate matter or otherwise), which may be particularly advantageous for determining the necessity of initiating a regeneration process of the HC-SCR catalyst 20. HC-SCR catalyst 20 may also incorporate OC 14, as described herein.

As the exhaust gas flow 4 traverses the length of the HC-SCR catalyst 20, particularly the flow channels and the washcoated cell walls, the platinum group metal catalyst or base metal catalyst, or a combination thereof, catalyzes various reactions as described herein. HC-SCR catalyst 20 may be used to reduce $NO_X$ within exhaust gas flow 4 to $N_2$ when the proper conditions for this reduction reaction exists within an exhaust gas treatment system 2, such as under conditions with relatively higher engine out HC levels where the $O_2$ that would otherwise promote the oxidization described has been consumed. This reduction reaction may also occur where relatively higher HC levels are obtained by the direct injection of HC upstream of HC-SCR catalyst 20 using the configuration of FIGS. 1-3, which conditions can be affected using control system 3, including the ECM 5. A exemplary reduction reaction for HC-SCR 20 is provided below:

$$\{HC\} + NO_X = N_2 + CO_2 + H_2O \qquad (1)$$

The relative amount of $N_2$, $CO_2$ and $H_2O$ will depend on the nature of the HC selected.

Referring again to the exemplary embodiments of FIGS. 1-3, the OC 14 is in fluid communication with the engine 10 and, with reference to the exhaust gas flow 4, is located downstream from the HC-SCR catalyst 20 and is configured to oxidize certain constituents of the exhaust gas flow 4 to produce unregulated by-products or constituents that are adapted for further treatment in other components of exhaust treatment system 1, as described herein. Generally, the OC 14 is a flow-through device, as described herein, that consists of a metal or ceramic monolith or substrate having a honeycomb-like structure that includes a plurality of generally parallel, longitudinally-extending, interconnected cells that provide a network comprising a plurality of flow channels for receiving exhaust gas flow 4 and are separated by a corresponding network of cell walls. The substrate has a large surface area along the cell walls. The cell walls have a washcoat that includes a porous ceramic matrix with a surface that is coated with a catalytically active amount of a Pt group metal catalyst. Suitable platinum group metals include Pt, Pd, Rh, Ru, Os or Ir, or a combination thereof Of these, Pt or Pd, or combinations thereof, including alloys thereof, are particularly useful. Those that include both Pt and Pd are particularly useful, such as those having Pt:Pd ratios of about 2:1 to about 4:1. As the exhaust gas flow 4 traverses the length of the OC 14, particularly the flow channels and the washcoated cell walls, the platinum group metal catalyst catalyzes the oxidation of CO to $CO_2$, as well as catalyzing the oxidation of various hydrocarbons (HC), including gaseous hydrocarbons and liquid hydrocarbon particles, including unburned fuel or oil, or fuel or other HC reductants that are introduced into exhaust gas treatment system to form $CO_2$ and $H_2O$, thereby reducing harmful emissions. In one configuration, during an advanced combustion operation of the engine, the control system 3 or ECM 5 may be used to cause combustion resulting in a higher level of HC in the exhaust gas flow 4 than is generated during normal combustion. The OC 14 is configured to catalyze the decomposition of at least a portion of the increased amounts of HC in order to reduce, or alternately to prevent, the HC in the exhaust gas flow from reaching the two-way catalyst 24 and poisoning this device by reducing its ability to catalyze $NO_X$, or from reaching the external environment by release from the exhaust gas treatment system 2.

The OC 14, such as a diesel oxidation catalyst, may be configured to convert various regulated exhaust constituents to other regulated or unregulated exhaust constituents through oxidation. For example, the OC 14 may be configured to oxidize hydrocarbons (HC) to carbon dioxide $CO_2$ and water ($H_2O$), convert carbon monoxide (CO) to carbon dioxide ($CO_2$) convert sulfur dioxide ($SO_2$) to sulfur trioxide ($SO_3$) and/or sulfuric acid ($H_2SO_4$) and convert nitrogen oxide (NO) to nitrogen dioxide ($NO_2$), or otherwise. Below are exemplary oxidation reactions contemplated with the OC 14 of the present invention.

$$HC+O_2=CO_2+H_2O \quad (2)$$

$$CO+\tfrac{1}{2}O_2=CO_2 \quad (3)$$

$$2SO_2+O_2=2SO_3 \quad (4)$$

$$SO_3+H_2O=H_2SO_4 \quad (5)$$

$$NO+\tfrac{1}{2}O_2=NO_2 \quad (6)$$

It should be appreciated that the OC 14 may be configured to perform any one of the above conversions, combinations of the above conversions, or even all of the above conversions, depending on the reactant compounds and their concentrations found in the exhaust gas flow 4, the temperature of OC 14, and the platinum group metals selected as the catalyst. Other oxidations are contemplated as well, such as oxidation of aldehydes, polycyclic aromatic hydrocarbons or otherwise. Further, the reactions in OC 14 may be used to reduce the odor of certain emission components.

OC 14 may be housed within a separate housing 15, including a metal housing, such as a metal can having an inlet opening and outlet opening, or otherwise, configured for providing support and directing fluid flow to the OC 14, as shown in FIG. 1. The housing 15 may comprise any suitable shape or size including a cylindrically shaped compartment. The compartment further may include attachment features, such as a cylindrical inlet pipe located proximate an inlet opening and a cylindrical outlet pipe located proximate an outlet opening of the compartment for fluid coupling of OC 14 to an exhaust pipe and/or another component of the exhaust gas treatment system 2. It should be appreciated that OC 14, including the housing 15, may include one or more additional components for facilitating in operation of OC 14, or exhaust gas treatment system 2, or control system 3, including, but not limited to, various gas or temperature sensors, injectors (urea or fuel injectors) or otherwise. Such additional features may be particularly advantageous for monitoring characteristics of the exhaust gas, such as flow rate of certain emission components (e.g., particulate matter or otherwise), which may be particularly advantageous for determining the necessity of initiating a regeneration process of the HC-SCR catalyst 20 or two-way catalyst 24.

In another exemplary embodiment, OC 14 may be housed in housing 23 together with and downstream of HC-SCR catalyst 20, as shown in FIG. 2. In this configuration, HC-SCR catalyst 20 may include one or more monoliths, as described herein, and OC 14 may include one or more monoliths, and these monoliths may be loaded together into housing 23 such that the respective monoliths are in fluid communication, such that exhaust gas flow 4 may enter at an inlet to HC-SCR catalyst 20, and be communicated through HC-SCR catalyst 20 and OC 14 to an outlet of OC 14.

In yet another exemplary embodiment, OC 14 may be incorporated into the downstream end of HC-SCR catalyst 20, as shown in FIG. 3. In this configuration, HC-SCR catalyst 20 may include one or more monoliths, as described herein, and OC 14 may be incorporated into the downstream end of the monolith of HC-SCR catalyst 20 that is furthest downstream. OC 14 may be incorporated onto a monolith that includes HC-SCR catalyst 20 by zone coating the catalyst materials for each, that is by applying a suitable washcoat to form HC-SCR catalyst 20 to one end of a monolith, and applying a suitable washcoat to form OC 14 to an opposed end of the same monolith.

In one particular configuration, OC 14 is configured to oxidize nitrogen oxide within exhaust gas flow 4 to nitrogen dioxide (see equation 6). This is advantageous as this conversion assists with the overall $NO_X$ conversion process by enabling subsequent reduction to nitrogen by the two-way catalyst 24 when the proper conditions for this reaction exist within exhaust gas treatment system 2. Oxidation of nitrogen and the other constituents described herein is promoted under lean burn conditions which have relatively higher $O_2$ levels and lower HC levels, which conditions can be affected using control system 2, including the ECM 5. Accordingly, placement of OC 14 upstream from the U-SCR catalyst 26, between the engine and the U-SCR catalyst 26, is particularly advantageous. It is also particularly advantageous to locate OC 14 proximate the engine, preferably as close to the engine as possible, in order to maintain an operating temperature within OC 14 of at least about 356° F. (180° C.), and more preferably in the range of about 482° F. (250° C.) to about 842° F. (450° C.).

Two-way catalyst 24 includes a urea selective catalyst reduction (U-SCR) catalyst 26 and a DPF 28. Two-way catalyst 24 is a wall-flow-device that consists of a ceramic monolith or substrate having a honeycomb-like structure that includes a plurality of generally parallel, longitudinally-extending, interconnected cells that provide a network comprising a plurality of flow channels for exhaust gas flow 4 and are separated by a corresponding network of porous cell walls. The substrate has a large surface area along the cell walls. Alternating adjacent cells have one of the inlet or outlet plugged such that an alternating array of inlets is plugged with inlets of the immediately adjacent cells being open, and an alternating array of outlets is plugged with outlets of the immediately adjacent cells being open. The structure has open pores in the cell walls. Thus, the exhaust gas flow 4 passes into the plurality of inlets and is forced through the porous cell walls and into the adjacent outlet cells where it then flows out the plurality of unplugged outlets. The pores permit the gaseous constituents to pass through the cell walls while the PM is entrapped within the pores, thereby providing the PM filtering action of DPF 28. The U-SCR catalyst 26 is provided as a washcoat disposed on the ceramic wall-flow monolith. The washcoat includes a reduction catalyst disposed on a ceramic matrix. The washcoat may be disposed along the cell walls of the plurality of inlet passages or the plurality of outlet passages or both. In one exemplary embodiment, the washcoat is disposed on the plurality of inlet passages providing the configuration illustrated in FIGS. 1-3 as two-way catalyst 24, wherein the U-SCR catalyst 26 is illustrated as being located upstream of DPF 28. Two-way catalyst 24 (FIGS. 1-3) also illustrates the configuration where the washcoat is disposed on the plurality of inlet and outlet passages. In another exemplary embodiment, the washcoat is disposed on the plurality of outlet passages providing the configuration illustrated in FIGS. 1-3 as two-way catalyst 24', wherein the U-SCR catalyst 26 is illustrated as being located downstream of DPF 28. The washcoat includes a porous matrix with a surface that is coated with a catalytically active amount of a reduction catalyst. The ceramic wall-flow monolith may be made from any suitable ceramic, including cordierite or alumina or the like. Use of two-way catalyst 24 is advantageous because of the space reduction achieved versus the use of a discrete DPF 28 and U-SCR catalyst 26, as well as the reduction in the overall number of individual exhaust components.

The two-way catalyst 24, including DPF 28 and U-SCR catalyst 26, is adapted to provide reduction of $NO_X$ (U-SCR catalyst 26) and collection of PM (DPF 28) over most of the operating temperature range of exhaust gas treatment system 2 and engine 10, including typical exhaust treatment system operating temperatures of from about 400° F. (about ~200° C.) to about 1022° F. (about 550° C.). The DPF 28 of two-way catalyst 24 filters soot over the entire operating temperature range of engine 10, including typical ambient vehicle storage/starting temperatures from about −40° F. (about −40° C.) to about 120° F. (about 49° C.) to operating temperatures up to about 1292° F. (about 700° C.). Passive regeneration of DPF 28 and oxidation of the soot particles occurs in the presence of $NO_X$ over the temperature range of 482° F. (250° C.) to about 842° F. (450° C.), whereas active regeneration and oxidation of the soot particles occurs in the presence of $O_2$ at temperatures of about 500° C. or more, and more preferably over the temperature range of about 1112° F. (600° C.) to about 1202° F. (650° C.).

The washcoat includes a porous ceramic matrix with a surface that is coated with a catalytically active amount of a base metal catalyst, i.e., an amount sufficient to catalyze the desired chemical reactions. Suitable base metal catalysts include copper (Cu), chromium (Cr) or iron (Fe), or a combination thereof, including alloys and compounds thereof. The porous matrix may include any suitable porous matrix. Suitable porous matrices include various zeolites. In the case of Cu catalysts, a suitable zeolite is one known commercially as ZSM-5. The use of a base metal catalyst allows conversion of the nitrogen oxides without the use of precious metals. The two-way catalyst 24 utilizes ammonia to reduce $NO_X$. For example, in an exemplary embodiment, a dosing device, such as urea dosing device 17, is provided upstream from the two-way catalyst 24 for introducing urea to the exhaust gas flow stream 4, such as through introduction of a urea solution. The urea is introduced upstream a sufficient distance from two-way catalyst 24 to permit the urea to decompose in the exhaust gas flow 4 to form ammonia prior to entering two-way catalyst 24. In one advantageous configuration, ammonia is also generated within the HC-SCR catalyst 20 and travels downstream to the two-way catalyst 24. In this configuration, reduced amounts of urea are needed due to the ammonia generated in the HC-SCR catalyst 20. Below are exemplary conversion chemical reactions contemplated with the two-way catalyst 24:

Urea decomposition:

$$CO(NH_2)_2 + H_2O \rightarrow 2NH_3 + CO_2 \tag{7}$$

$NO_X$ reduction reations in two-way catalyst 24:

$$6NO + 4NH_3 \rightarrow 5N_2 + 6H_2O \tag{8}$$

$$4NO + 4NH_3 + O_2 \rightarrow 4N_2 + 6H_2O \tag{9}$$

$$6NO_2 + 8NH_3 \rightarrow 7N_2 + 12H_2O \tag{10}$$

$$2NO_2 + 4NH_3 + O_2 \rightarrow 3N_2 + 6H_2O \tag{11}$$

$$NO + NO_2 + 2NH_3 \rightarrow 2N_2 + 3H_2O \tag{12}$$

It should be appreciated that the two-way catalyst 24 may be configured to perform any one of the above conversions, or combinations of the above conversions, including all of the above conversions. The two-way catalyst 24 begins to function as described above at an operating temperature of at about 356° F. (180° C.), and may be more preferably operated in the range of about 482° F. (250° C.) to about 1022° F. (550° C.).

The two-way catalyst 24 is housed within a housing 25, such as a metal can, configured to provide support and direct the exhaust gas flow 4 into, through and out of two-way catalyst 24. The housing 25 may have any suitable shape or size including a cylindrical shape. The housing 25 may also include attachment features located proximate to an inlet opening, such as an inlet pipe, and an outlet opening, such as an outlet pipe, for fluid coupling of the two-way catalyst 24 to an exhaust pipe and/or other component of the exhaust gas treatment system 2. It should be appreciated that the two-way catalyst 24, including housing 25, may include one or more additional components for facilitating operation of the exhaust gas treatment system 2, including, but not limited to, sensors, dosing devices (urea or fuel injectors) or otherwise. Such additional features may be particularly advantageous for monitoring characteristics of the exhaust gas, such as the amounts or flow rates of certain emission constituents, which are particularly advantageous for control of the exhaust gas treatment system 2, including regeneration of the two-way catalyst 24. Exhaust treatment system 2 may also include singly, or in combination, additional exhaust aftertreatment devices, including catalyzed or uncatalyzed particulate filters, additional oxidation catalysts, catalyzed soot filters, soot filters, $NO_X$ traps, NSR catalysts, partial hydrocarbon oxidation catalysts, air pumps, external heating devices, precious metal catalysts, sulfur traps, phosphorous traps, $PO_X$ reformers and the like. Each of the additional exhaust aftertreatment devices employs technologies having various capabilities for treating the constituent elements of the exhaust gas flow 4. These devices may be fluidly connected in series or parallel using known pipes, conduits and connectors.

The aftertreatment system includes sensing devices and systems preferably signally connected to the ECM 5. The sensing devices may include a $NO_X$ sensor 12 operative to sense exhaust gases exiting the engine 10, a temperature sensor 27 operative to measure temperature of exhaust gases upstream of the HC-SCR catalyst 20 to determine an operating temperature of the HC-SCR catalyst 20, and exhaust gas sensing device 22 which is a second sensor operative to monitor constituent elements of exhaust gases after the HC-SCR catalyst 20 for feedback and diagnostics. The $NO_X$ sensor 12 preferably comprises a sensor operative to generate an electrical signal correlatable to a parametric value for $NO_X$ concentration in the exhaust gas flow 4, and further operative to generate a second electrical signal correlatable to a parametric value for air/fuel ratio of the exhaust gas feedstream, from which oxygen content can be determined. The exhaust gas sensing device 22 preferably comprises a second $NO_X$ sensor, operative to generate an electrical signal correlatable to a parametric value for $NO_X$ concentration in the exhaust gas feedstream. Alternately, $NO_X$ sensor 12 can comprise a virtual sensing device, wherein $NO_X$ concentration in the exhaust gas flow 4 is determined based upon engine operating conditions, which is a known technique.

The exhaust aftertreatment system 2 includes a hydrocarbon (HC) dosing device 16 for injecting a controlled amount of HC reductant upstream of HC-SCR catalyst 20. An exemplary HC dosing device includes a fuel injector, such as a diesel fuel injector, for injecting diesel fuel into exhaust gas flow 4. The fuel line 30 from engine 10 provides pressurized fuel to a controllable pressure regulator device 32, such as a valve, the output of which is fluidly connected through conduit 34 to the reductant dosing device 16. The HC dosing device 16 and pressure regulator device 32 are both operably connected to the ECM 5, which is adapted to control timing and quantity (e.g., mass flow) of HC injection, typically in the form of vehicle fuel, to the exhaust gas feedstream. Alternatively hydrocarbons from a hydrocarbon reservoir (not shown) or reformer device (not shown) may be used as reductant material to reduce $NO_X$ in HC-SCR catalyst 20, using a post-injection control strategy.

The exhaust treatment system 2 also includes a urea dosing device 17, such as a urea injector, for injecting a controlled amount of urea or ammonia as a reductant upstream of the two-way catalyst 24 from a urea reservoir 19 through conduit 21. As used herein, the term urea may also include the use of ammonia ($NH_3$) as a reductant, since the urea decomposes to produce ammonia as a reaction by-product, and it is the ammonia that is used as a reactant species in the catalytic reactions that occur in two-way catalyst 24. An example of a suitable urea reservoir would be a urea tank. The urea dosing device 17 is operably connected to the ECM 5, which is adapted to control timing and quantity of urea injection into the exhaust gas flow 4. When urea is used as the reductant, injection should occur sufficiently upstream from two-way catalyst 24 to enable the decomposition of the urea to ammonia prior to entry into two-way catalyst 24.

The control system 3 preferably comprises a distributed control module architecture including a plurality of control modules adapted to provide coordinated control of the various vehicle systems including the powertrain system described herein. The control system is operable to monitor inputs from sensing devices, synthesize pertinent information, and execute algorithms to control various actuators to meet operator demands and achieve control targets, including such parameters as fuel economy, emissions, performance, drivability, and protection of hardware. The distributed controller architecture includes ECM 5, and User Interface (UI) 13 which is operably connected to other devices through which a vehicle operator typically controls or directs operation of the vehicle and powertrain. Devices through which a vehicle operator provides input to the UI 13 typically include an accelerator pedal, a brake pedal, transmission gear selector, and, vehicle speed cruise control. Each of the aforementioned control modules and devices communicate with other control modules, devices, sensors, and actuators via a high-speed local area network (LAN) bus, shown generally as item 6. The LAN bus 6 allows for structured communication of control parameters and commands between the various processors, control modules, and devices. The specific communication protocol utilized is application-specific. The LAN bus and appropriate protocols provide for robust messaging and multi-control module interfacing between the aforementioned control modules and other control modules providing functionality such as antilock brakes, traction control, and vehicle stability.

The ECM 5 comprises a central processing unit signally electrically connected to volatile and non-volatile memory devices via data buses. The ECM 5 is operably attached to sensing devices and other output devices to ongoingly monitor and control operation of the engine 10 and exhaust aftertreatment system, as shown. The output devices preferably include subsystems necessary for proper control and operation of the engine, including, by way of example, an air intake system, a fuel injection system, a spark-ignition system (when a spark-ignition engine is used, e.g., a homogeneous charge compression ignition engine), an exhaust gas recirculation (EGR) system, and an evaporative control system. The engine sensing devices include devices operable to monitor engine operation, external conditions, and operator demand, and are typically signally attached to the ECM 5 via wiring harnesses.

Algorithms stored in the non-volatile memory devices are executed by the central processing unit and are operable to monitor inputs from the sensing devices and execute engine control and diagnostic routines to control operation of the engine, using preset calibrations. Use of the ECM 5 to control and diagnose operation of various aspects of the internal combustion engine 10 is well known to one skilled in the art. However, the ECM 5 may be adapted to exploit the unique advantages of exhaust gas emission system 2 as described herein, to maximize the reduction of $NO_X$ under various operating regimes of engine 10, and also to maintain acceptable levels of $NO_X$ reduction during regeneration of HC-SCR catalyst 20 or two-way catalyst 24.

Catalyst temperatures ranging from −40-650° C. within exhaust emission treatment system 2 are possible, as well as the following ranges of gas phase concentrations that the catalysts may potentially be exposed to: $O_2$ (2-21%), $NO_X$ (0-1500 ppm), and $H_2$ (up to 4%) supplied by either a $PO_X$ fuel reformer or in-cylinder combustion control such as post-injection. In addition, exhaust flow rates ranging from 100 kg/hour at idle to 1200 kg/hour under acceleration conditions result in space velocities (SV) ranging from about 5,000 $h^{-1}$ to 60,000 $h^{-1}$ for a catalytic reactor devices. Heavier hydrocarbons (e.g., n-dodecane) that are present in diesel fuel provide $NO_X$ conversion at a lower temperature range, which facilitates introduction of secondary fuel injection into the exhaust gas. Addition of hydrogen to the feedstream (e.g., by incorporating a $PO_X$ reformer (not shown)) lowers light-off temperature further for $NO_X$ conversion over $Ag/Al_2O_3$ catalysts for both light (propene, propane) and heavy (n-dodecane) hydrocarbons. Addition of carbon monoxide into the exhaust gas feedstream has not been shown to reduce $NO_X$ over $Ag/Al_2O_3$ catalysts.

The specific control strategy employed, i.e., HC injection amount versus $H_2$ injection amount versus $NO_2$ fraction described herein is ultimately dependent on the SV and temperature of the HC-SCR catalyst 20 as well as the inlet $NO_X$ concentration. Care should be taken under conditions with low $O_2$ concentrations (<10%) and/or low temperatures (<350° C.) without excess $H_2$ addition in the feedstream (i.e., ≦250 ppm $H_2$) to ensure that excess amounts of HC are not injected so as to minimize coke formation and possible deactivation of the HC-SCR catalyst 20.

Exhaust conditions that can be controlled during ongoing engine operation include the amount of injected diesel fuel, i.e., hydrocarbon (HC) used for reduction of NOX over the HC-SCR catalyst 20 and the $H_2$ injection amount from either a $PO_X$ fuel reformer or an in-cylinder post-injection control strategy. In addition, magnitude of EGR (in %) and PCCI (premixed charge compression ignition) combustion can be used to lower engine-out $NO_X$ concentrations and vary $O_2$ concentration in the exhaust feedstream.

The invention comprises a method to selectively reduce the engine-out $NO_X$ concentration to $N_2$ in the exhaust gas feedstream using operating condition control of the exemplary internal combustion engine during operation lean of stoichiometry. It comprises determining a measure of $NO_X$ gases in the exhaust gas feedstream and a preferred hydrocarbon/$NO_X$ ratio based upon selected parameters of the exhaust gas feedstream; and, selectively dispensing the hydrocarbon reductant into the exhaust gas feedstream upstream of the Ag-alumina HC-SCR catalyst 20. Fuel is the preferred reductant to reduce $NO_X$ in the silver-alumina HC-SCR catalyst 20. Engine operating conditions and exhaust gas temperature ranges are defined which yield optimum $NO_X$ conversion. The exhaust system 2 operating parameters of interest include catalyst operating temperature, the exhaust gas flow rate, $NO_X$ concentration, and oxygen concentration. The parameters are preferably used by the control system to calculate an optimum $HC_1/NO_X$ ratio for the $NO_X$ reduction under the specific operating conditions. The $HC_1/NO_X$ ratio is defined as an amount of injected fuel on a $C_1$ basis divided by the inlet $NO_X$ concentration (e.g., 1 ppm evaporated diesel fuel has approximately 14 carbon atoms; therefore, a $HC_1$:$NO_X$ ratio of 10 with 100 ppm inlet $NO_X$ in the exhaust feedstream requires injection of 10×100/14=71 ppm diesel fuel). The $HC_1/NO_X$ ratio is used to calculate and inject the correct fuel quantity for $NO_X$ reduction over the catalyst. The engine operating parameters are further used to calculate optimum hydrogen ($H_2$) concentration for $NO_X$ reduction, which can be injected into the exhaust feedstream using available methods such as a partial oxidation fuel reformer or an in-cylinder post-injection system. Criteria for selecting optimum catalyst volume for a given engine are defined, comprising volumetric exhaust gas flow rate/catalyst volume=space velocity in $h^{-1}$. Furthermore, methods described herein are effective to yield high $NO_X$ conversion at engine-out $O_2$ concentrations as low as 2%. Such engine control schemes as exhaust gas recirculation (EGR) and premix charge compression ignition (PCCI) and other low temperature combustion strategies are employed to vary the engine-out $NO_X$ and $O_2$ concentrations to achieve optimum $NO_X$ conversion over the catalyst. Tradeoffs between engine-out $NO_X$ levels and engine-out $O_2$ levels to yield the optimum $NO_X$ conversion are defined. An oxidation device such as a known diesel oxidation catalyst or a known plasma ozone-generating device can be used upstream of the $NO_X$ reduction catalyst to oxidize NO (primary engine-out $NO_X$ species) to $NO_2$ at low temperature to yield the optimum $NO_X$ conversion. Less fuel reductant and more $H_2$ are preferably injected at low temperatures. Conversely, more fuel reductant and less $H_2$ are injected at high temperatures. Higher quantities of $H_2$ are injected under high exhaust gas flow conditions. The aforementioned operating parameters are applicable to calculate an optimum $HC_1/NO_X$ ratio for $NO_X$ reduction, based upon on catalyst formulation, e.g., Ag-metal loading, washcoat loading, and addition of other non-Ag components. Use of such control strategies permits optimization of vehicle fuel economy while achieving maximum $NO_X$ reduction over the catalyst, through a combination of EGR, PCCI (low temperature) combustion, fuel quantity injected, and $H_2$ quantity injected. Furthermore, operating limits for use of injected reductant fuel under conditions of high space velocity, low $O_2$ concentration, and low temperature are definable to minimize potential coke formation (carbonaceous deposits) and possible catalyst deactivation without excess $H_2$ addition in the exhaust feedstream. Fuel components that yield the optimum $NO_X$ conversion can be identified.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust emission treatment system for a vehicle, comprising:
   an HC-SCR catalyst comprising a non-Pt group metal catalyst material disposed on a ceramic matrix and configured to receive an exhaust gas flow from an engine;
   an oxidation catalyst comprising a Pt group metal catalyst material and configured to receive the exhaust gas flow from the HC-SCR catalyst;
   an U-SCR catalyst and a particulate filter, one of the U-SCR catalyst or the particulate filter configured to receive the exhaust gas flow from the oxidation catalyst; and
   the other one of a U-SCR catalyst or the particulate filter configured to receive the exhaust gas flow from the respective one.

2. The emission treatment system of claim 1, wherein the non-Pt group metal catalyst material of the HC-SCR catalyst comprises Ag, an Ag compound or an Ag alloy, or a combination thereof and the ceramic matrix comprises alumina.

3. The emission treatment system of claim 2, wherein the catalyst material of the HC-SCR catalyst further comprises Zr, Nb, Y, Hf, La, Ce or Nd, or an oxide of them, or an alloy of them, or a combination thereof disposed on the ceramic matrix.

4. The emission treatment system of claim 2, wherein the non-Pt group metal is Ag or an Ag compound comprising about 1-4% by weight of the catalyst.

5. The emission treatment system of claim 4, wherein the catalyst material of the HC-SCR catalyst further comprises a Pt group metal disposed on the ceramic matrix.

6. The emission treatment system of claim 5, wherein the Pt group metal comprises Pt, Rh, Ir, Ru, Re, Os or Pd, or an alloy of them, or a combination thereof.

7. The emission treatment system of claim 4, wherein a ratio of an atom fraction of the Pt group metal in the HC-SCR catalyst to a sum of the atom fraction of the Pt group metal and an atom fraction of the Ag or Ag compound is present in an atomic fraction of 0.25 or less of the combination of the Pt group metal and Ag or Ag compound.

8. The emission treatment system of claim 1, wherein the HC-SCR catalyst comprises a washcoat having about 1.0-4.0 $g/cm^3$ of the catalyst material.

9. The emission treatment system of claim 1, wherein ceramic matrix comprises a washcoat disposed on the surface of a substrate.

10. The emission treatment system of claim 9, wherein the substrate comprises a ceramic or metal flow-through monolith.

11. The emission treatment system of claim 1, wherein the non-Pt group metal comprises copper, a copper compound, a copper alloy, chromium, a chromium compound, a chromium alloy, iron, an iron compound or an iron alloy, or a combination thereof and the ceramic matrix comprises a zeolite.

12. The emission treatment system of claim 11, wherein the zeolite comprises ZSM-5, ZSM-11 or ZSM-12, or a combination thereof.

13. The emission treatment system of claim 12, wherein the catalyst material of the HC-SCR catalyst further comprises Zr, Nb, Y, Hf, La, Ce or Nd, or an oxide of them, or an alloy of them, or a combination thereof disposed on the ceramic matrix.

14. The emission treatment system of claim 1, wherein the Pt group metals of the oxidation catalyst comprise Pt, Rh, Ir, Ru, Re, Os or Pd, or alloys thereof, or a combination thereof.

15. The emission treatment system of claim 1, further comprising a hydrocarbon dosing device configured to release a hydrocarbon material into the exhaust gas flow upstream of the HC-SCR catalyst and a urea dosing device configured to release urea into the exhaust gas flow located upstream of the U-SCR catalyst.

16. The emission treatment system of claim 1, wherein the HC-SCR and oxidation catalyst are both formed on a single ceramic or metal flow-through monolith.

17. The emission treatment system of claim 1, wherein the monolith has an inlet end and an outlet end and the HC-SCR is located proximate the inlet end and the oxidation catalyst is located proximate the outlet end.

18. The emission treatment system of claim 1, wherein the HC-SCR catalyst is formed on a first ceramic or metal monolith and the oxidation catalyst is formed on a second ceramic or metal monolith.

19. The emission treatment system of claim 1, wherein the first monolith and second monolith are disposed in a single housing.

20. The emission treatment system of claim 1, further comprising the engine, wherein the engine comprises a diesel or a gasoline engine configured for lean burn operation.

\* \* \* \* \*